(12) United States Patent
Chan et al.

(10) Patent No.: US 8,417,752 B1
(45) Date of Patent: Apr. 9, 2013

(54) OFFSET CANCELLATION IN EQUALIZER CIRCUITRY

(75) Inventors: Doris Po Ching Chan, Santa Clara, CA (US); Simardeep Maangat, Sunnyvale, CA (US); Thungoc M. Tran, San Jose, CA (US); Sergey Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 923 days.

(21) Appl. No.: 12/470,254

(22) Filed: May 21, 2009

(51) Int. Cl.
*G06F 7/10* (2006.01)
*G06F 7/00* (2006.01)

(52) U.S. Cl.
USPC ............................ 708/323; 708/205; 708/209

(58) Field of Classification Search ........................ None
See application file for complete search history.

(56) References Cited

U.S. PATENT DOCUMENTS

2011/0235696 A1 * 9/2011 Momtaz ........................ 375/233

* cited by examiner

*Primary Examiner* — Scott Sun
(74) *Attorney, Agent, or Firm* — Mauriel Kapouytian & Treffert LLP; Ararat Kapouytian (57) ABSTRACT

An equalizer circuitry that includes an equalizer stage having a programmable current source is described. In one implementation, the programmable current source cancels voltage offset. Also, in one implementation, the programmable current source is programmable in user mode. Furthermore, in one implementation, the equalizer circuitry includes a plurality of equalizer stages including the equalizer stage having a programmable current source, where the equalizer stage having a programmable current source is a second equalizer stage in the plurality of equalizer stages. Also, in one implementation, the programmable current source includes a plurality of current sources coupled in parallel and a plurality of sets of control switches for controlling the plurality of current sources. Further, in one implementation, each current source of the plurality of current sources includes a transistor and each set of control switches of the plurality of sets of control switches is for controlling a respective current source and includes a pair of transistors for controlling the respective current source.

18 Claims, 5 Drawing Sheets

OFFSET CANCELLATION IN EQUALIZER CIRCUITRY

BACKGROUND

Embodiments of the present invention relate to equalizer circuitry.

In some transmission links (e.g., high speed transmission links), the input data (e.g., differential input data) is degraded due to high frequency loss. Equalizer circuitry (including equalizer stages) in the receiver is used to compensate for this effect so that subsequent stages (e.g., a sense amplifier in the slicer stage) can correctly detect the signal polarity. However, since many high speed protocols can have input swings as low as 100 millivolts (mV), a small voltage offset in the equalizer stages can cause degradation in the equalized signal and posts a significant challenge for the subsequent stages to interpret the correct data. These voltage offsets intrinsic to the equalizer stages can reduce the amount of differential signal swing to the slicer stage and post a more stringent requirement on the slicer stage. In extreme cases where the voltage offset is large, the equalizer stages can even flip the input data such that the output data has a different polarity from its corresponding input data.

As process dimension shrinks, the process mismatches increase, resulting in higher voltage offsets in the equalizer stages. The process mismatches include systematic mismatches (such as layout mismatches) and local variations in the process (which are even more severe at smaller process dimensions). The mismatches resulting in voltage offsets can, for example, originate in the load resistors, the differential pair, or the current sources of the equalizer stages. More specifically, mismatches between such equalizer stage components on the right and left sides of the equalizer stage can result in voltage offsets between those two sides. These mismatches cause the output voltage of the equalizer stage to have a direct current (DC) voltage offset. In other words, the difference in the output voltages on the two sides of the equalizer stage have a DC voltage offset relative to a case without mismatch between the two sides of the equalizer stage. The equalizer circuitry has an overall DC voltage offset that is the result of the DC voltage offsets in the individual equalizer stages of the equalizer circuitry.

The voltage offset degrades the jitter performance of the receiver. This jitter performance is further degraded with increased data rates and lower input voltage swings.

Thus, as process dimensions shrink, data rates increases, and input voltage swings are lowered, the jitter performance of the receiver due to voltage offset becomes increasingly worse.

Embodiments of the equalizer circuitry of the present invention arise in this context.

SUMMARY

In one aspect, an embodiment of the present invention provides an equalizer circuitry including an equalizer stage having a programmable current source. In one embodiment, the programmable current source cancels voltage offset. Also, in one embodiment, the programmable current source is programmable in user mode.

In one embodiment, the equalizer circuitry includes a plurality of equalizer stages including the equalizer stage having a programmable current source, where the equalizer stage having a programmable current source is a second equalizer stage in the plurality of equalizer stages. Also, in one embodiment, the programmable current source includes a plurality of current sources coupled in parallel and a plurality of sets of control switches for controlling the plurality of current sources. Further, in one embodiment, each current source of the plurality of current sources includes a transistor and each set of control switches of the plurality of sets of control switches is for controlling a respective current source and includes a pair of transistors for controlling the respective current source.

In one embodiment, the equalizer stage includes: load resistors; a differential pair coupled to the load resistors; a pair of non-programmable current sources coupled to the differential pair, wherein the programmable current source is coupled in parallel to one non-programmable current source of the pair of non-programmable current sources; a degenerating resistor coupled to the differential pair; a degenerating capacitor coupled to the differential pair; and a second programmable current source coupled in parallel to another non-programmable current source of the pair of non-programmable current sources.

An embodiment of the present invention cancels voltage offsets in the equalizer circuitry and results in improved jitter performance. Though generally beneficial, embodiments of the present invention are particularly useful in devices fabricated using small process dimensions that operate at higher input data rates and have lower input voltage swings.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION

The following description is presented to enable any person skilled in the art to make and use embodiments of the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
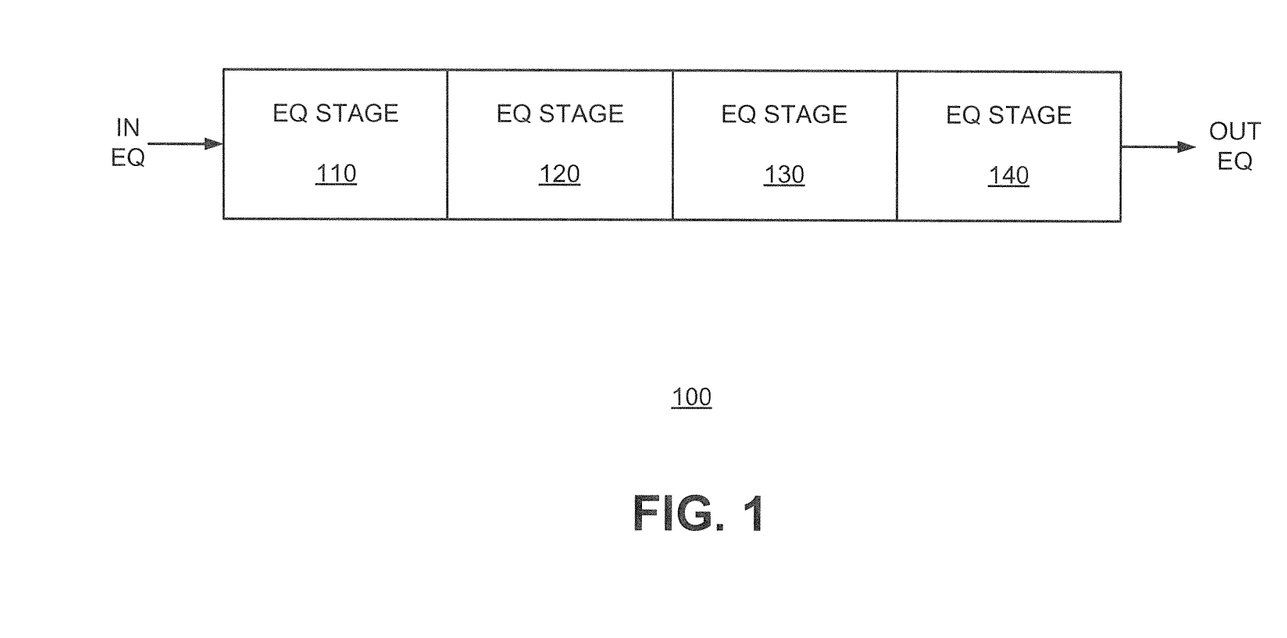
FIG. 1 is a simplified schematic block diagram of one embodiment of an equalizer circuitry of the present invention.

FIG. 1 is a block diagram of one embodiment of an equalizer circuitry of the present invention. In FIG. 1, equalizer circuitry 100 includes equalizer (EQ) stages 110, 120, 130, and 140. Equalizer stages 110, 120, 130, and 140 are respectively the first, second, third, and fourth equalizer stages in equalizer circuitry 100. Equalizer circuitry 100 may also herein be referred to as equalizer 100 or equalizer filter 100. Equalizer circuitry 100 includes four equalizer stages. However, it is not limited to including only four stages. In another embodiment, equalizer circuitry 100 may generally include N equalizer stages, where N is an integer greater than or equal to 1 representing the number of equalizer stages. The input to and the output from equalizer circuitry 100 are IN EQ and OUT EQ, respectively. In one embodiment, both IN EQ and OUT EQ are differential voltage signals. Furthermore, in one embodiment, equalizer circuitry 100 is a linear time invariant system. Also, in one embodiment, OUT EQ is provided to a slicer (not shown). Equalizer stage 110 (the first equalizer stage) receives the input IN EQ, whereas equalizer stage 140 (the fourth equalize stage) provides the output OUT EQ.

Figure 2:
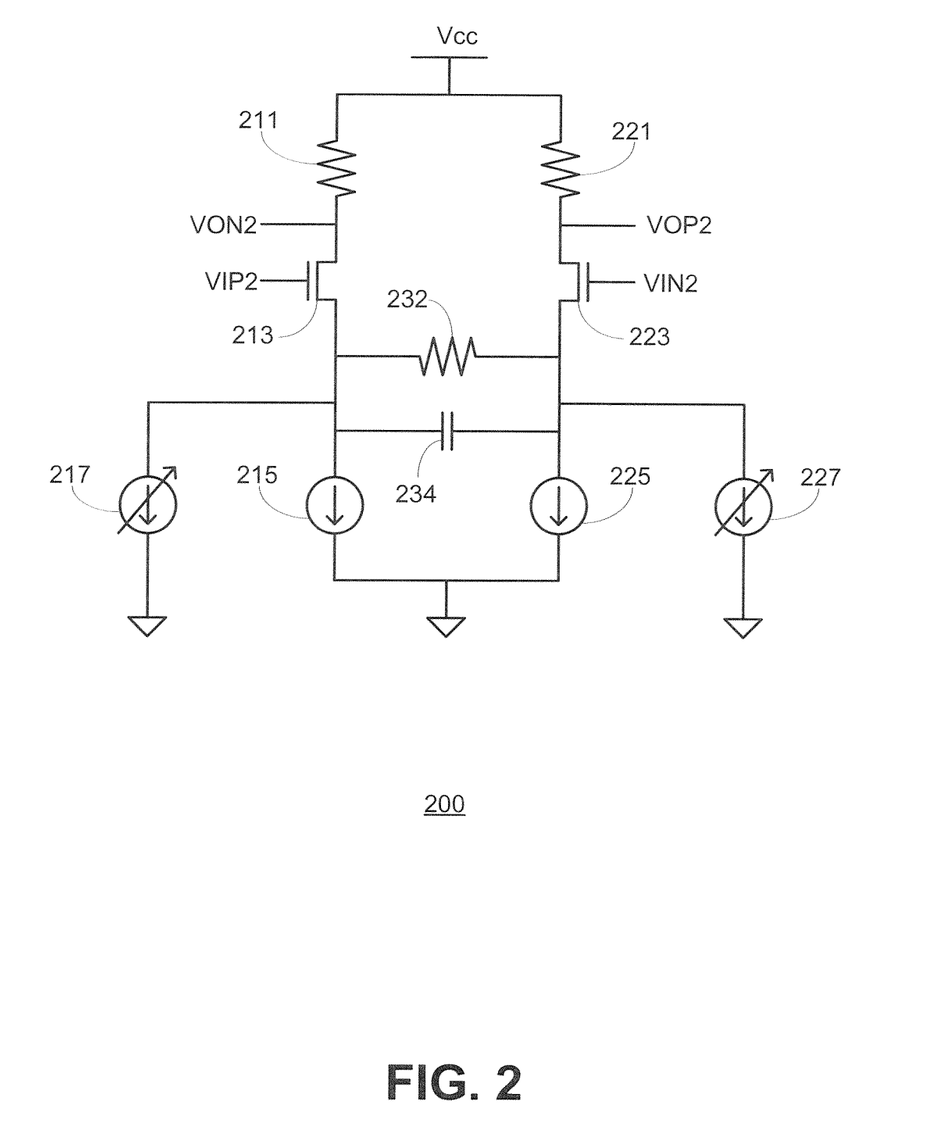
FIG. 2 is a more detailed diagram of an embodiment of an equalizer stage of the equalizer circuitry of FIG. 1.

FIG. 2 is a more detailed diagram of an embodiment of an equalizer stage of the equalizer circuitry of FIG. 1. In FIG. 2, equalizer stage 200 includes load resistors 211 and 221, differential transistors 213 and 223, current sources 215, 217, 225, and 227, degenerating resistor 232, and degenerating capacitor 234, which are coupled as shown. Equalizer stage 200 may also herein be referred to as a differential amplifier. Differential transistors 213 and 223 may also herein be referred to as differential switches or a differential pair. In one embodiment, current sources 215 and 225 are non-programmable current sources. Also, in one embodiment, current sources 217 and 227 are programmable current sources, which may also herein be referred to as variable current sources. In one embodiment, current sources 217 and 227 are programmable in user mode. In other words, they are programmable during runtime.

As shown in FIG. 2, load resistors 211 and 221 are coupled to voltage supply Vcc. Also, load resistors 211 and 221 are coupled to output terminals for providing output voltages VON2 and VOP2, respectively, and to differential transistors 213 and 223, respectively. Differential transistors 213 and 223 are in turn coupled to non-programmable current sources 215 and 225, respectively, and to programmable current sources 217 and 227, respectively. Differential transistors 213 and 223 are also coupled to input terminals for receiving input voltages VIP2 and VIN2, respectively. Degenerating resistor 232 and degenerating capacitor 234 are coupled to differential transistors 212 and 222 and current sources 215, 217, 225, and 227, which are coupled to ground.

The inputs to equalizer stage 200 are VIP2 and VIN2, which are collectively a differential voltage signal. Equalizer stage 200 receives VIP2 and VIN2 and outputs VOP2 and VON2, which are also collectively a differential voltage signal. In one embodiment, equalizer stage 200 amplifies the high frequency components of VIP2 and VIN2. In other words, in one embodiment, equalizer stage 200 provides in for VIP2 and VIN2 when they are transitioning from a binary high voltage signal to a binary low voltage signal or vice versa. On the other hand, in one embodiment, equalizer stage 200 provides no gain for the DC components of VIP2 and VIN2. In other words, in one embodiment, equalizer stage 200 provides no gain for VIP2 and VIN2 when they are not transitioning from a binary high voltage signal to a binary low voltage signal or vice versa. In another embodiment, equalizer stage 200 may provide a gain for the DC components of VIP2 and VIN2.

Also, in another embodiment, non-programmable current source 215 and programmable current source 217 may be collectively replaced by a programmable current source. Similarly, in another embodiment, non-programmable current source 225 and programmable current source 227 may be collectively replaced by a programmable current source.

An equalizer stage, such as equalizer stage 200, with one or more programmable current sources, such as programmable current sources 217 and 227, may herein be referred to as an equalizer stage with voltage offset compensation. On the other hand, an equalizer stage without any programmable current sources, such as programmable current sources 217 and 227, may herein be referred to as an equalizer stage without voltage offset compensation. With the exception of not including programmable current sources 217 and 227, an equalizer stage without voltage offset compensation is otherwise identical to equalizer stage 200.

Equalizer stage 200 may represent one or more of the equalizer stages in equalizer circuitry 100. In one embodiment, equalizer stage 200 represents the second equalizer stage in equalizer circuitry 100. In such an embodiment, VIP2 and VIN2 represent the differential input signals to the second equalizer stage and are received from the first equalizer stage, whereas VON2 and VOP2 represent differential output signals from the second equalizer stage and are provided to the third equalizer stage as input signals.

Referring back to FIG. 1, in one embodiment, equalizer circuitry 100 includes four equalizer stages cascaded together and each equalizer stage may contribute to the total or overall voltage offset of equalizer circuitry. In a four stage equalizer circuitry, such as equalizer circuitry 100, the overall voltage offset (i.e., the total maximum input referred voltage offset) can be calculated using the following equation:

$$VOS=VOS1/A1+VOS2/A1A2+VOS3/A1A2A3+VOS4/A1A2A3A4,$$

where A1, A2, A3 and A4 are the DC voltage gains of equalizer stages 110, 120, 130, and 140, respectively, and VOS1, VOS2, VOS3 and VOS4 are the voltage offsets (more specifically, the DC voltage offsets) of equalizer stages 110, 120, 130, and 140, respectively.

In one embodiment, the overall voltage offset of the equalizer circuitry is cancelled using only one equalizer stage with voltage offset compensation. In other words, in one embodiment, one equalizer stage in the equalizer circuitry is with voltage offset compensation, whereas the remaining equalizer stages are without voltage offset compensation. This reduces the cost and complexity associated with having multiple equalizer stages with voltage offset compensation. As also used herein, cancelling voltage offset encompasses substantially cancelling voltage offset.

In one embodiment, the amount of overall voltage offset is determined as follows. Under the condition of VIN=VIP, the overall voltage offset VOP−VON is determined for different applied programmable currents, where VIN and VIP represent the differential input signals to the equalizer circuitry and VOP and VON represent the differential output signals from the equalizer circuitry. The programmable currents for which VOP=VON (under the condition of VIN=VIP) are the programmable currents needed for achieving overall voltage offset cancellation. In one embodiment, the programmable currents required for overall voltage offset cancellation is determined during device characterization.

In one embodiment, particularly with positive DC gains, the equalizer stage with voltage offset cancellation is an earlier stage in the equalizer circuitry. In one embodiment, this reduces the magnitude of the cancellation required. More specifically, in one embodiment, the equalizer stage with voltage offset cancellation is the second equalizer stage in the equalizer circuitry. In one embodiment where the first equalizer stage is without voltage offset cancellation, the first equalizer stage may be disabled during calibration of the amount of offset needed to cancel the overall voltage offset. For example, in one embodiment where the second equalizer stage, rather than the first equalizer stage, is the equalizer stage with voltage offset cancellation, the first equalizer stage may be disabled during calibration of the amount of offset needed to cancel the overall voltage offset.

In another embodiment, more than one equalizer stage of equalizer circuitry 100 may be equalizer stages with voltage offset compensation. In one such embodiment, each individual equalizer stage is individually calibrated. In another such embodiment, the equalizer stages are collectively calibrated.

In an equalizer stage with voltage offset compensation, the current on either the right side or the left side of the equalizer stage may be increased to cancel positive or negative voltage offsets. The current on the left side refers to the current through resistor 211 and transistor 213 (which is the combined current of current sources 215 and 217). The current on the right side refers to the current through resistor 221 and transistor 223 (which is the combined current of current sources 225 and 227). The current is increased by applying additional current from programmable current 217 or programmable current 227. In one embodiment where only one equalizer stage is with voltage offset cancellation, the additional current is intended to cancel the overall voltage offset for the equalizer circuitry. On the other hand, in embodiments where each equalizer stage in the equalizer circuitry is with voltage offset compensation, for each equalizer stage, the additional current is for cancelling voltage offset in that equalizer stage.

It is to be noted that the additional current from the programmable current source(s) cancels voltage offset with less effect on the bandwidth performance of the equalizer circuitry than would cancelling the voltage offset by introducing compensating mismatches between the resistive loads or the differential pairs to counteract the intrinsic mismatches that result in voltage offset.

Figure 3:
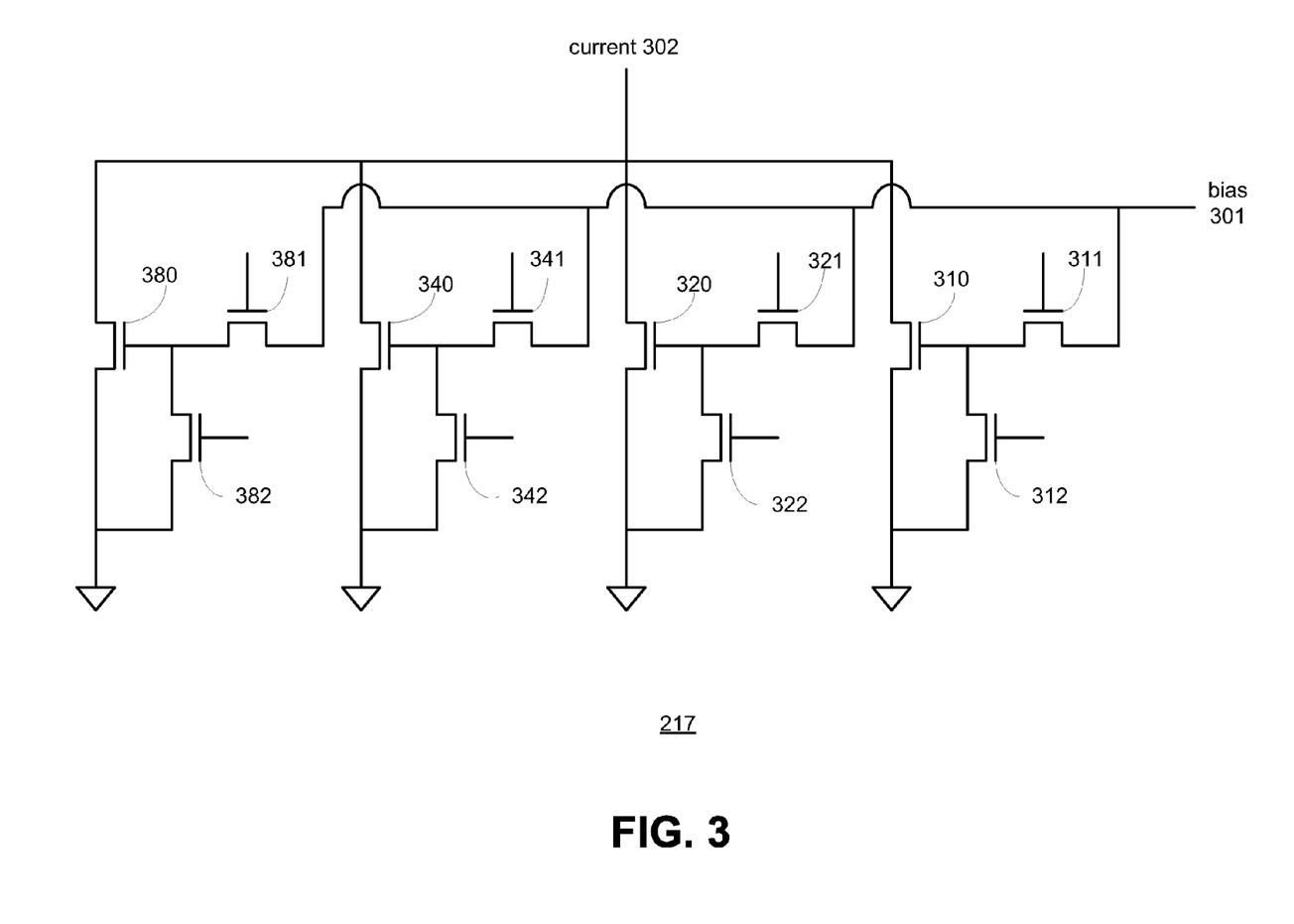
FIG. 3 is a detailed diagram of an embodiment of one variable current source of FIG. 2.

FIG. 3 is a detailed diagram of an embodiment of one variable current source of FIG. 2. In FIG. 3, programmable current source 217 includes current sources 310, 320, 340, and 380, and control switches 311, 312, 321, 322, 341, 342, 381, and 382, which are coupled as shown. Current sources 310, 320, 340, and 380 may also herein be referred to as transistors 310, 320, 340, and 380. Similarly, control switches 311, 312, 321, 322, 341, 342, 381, and 382 may also herein be referred to as transistors or control transistors 311, 312, 321, 322, 341, 342, 381, and 382.

In one embodiment, the sizes of transistors 320, 340, and 380 relative to that of transistor 310 are 2, 4, and 8, respectively. More specifically, in one embodiment, the current produced by transistors 320, 340, and 380 relative to that produced by transistor 310 are 2, 4, and 8, respectively. It is to be noted that other size and current ratios may also apply. Current 302 represents the total current produced by programmable current source 217 and is the sum of the currents produced by transistors 310, 320, 340, and 380.

As can be seen in FIG. 3, control switches 311 and 312 are coupled to transistor 310, control switches 321 and 322 are coupled to transistor 320, control switches 341 and 342 are coupled to transistor 340, and control switches 381 and 382 are coupled to transistor 380. More specifically, control switch 311 is coupled to a bias voltage (bias 30)) and the gate of transistor 310, whereas control switch 312 is coupled to control switch 311, the gate of transistor 310, and ground. Similarly, control switch 321 is coupled to the bias voltage (bias 301) and the gate of transistor 320, whereas control switch 322 is coupled to control switch 321, the gate of transistor 320, and ground. Similarly, control switch 341 is coupled to the bias voltage (bias 301) and the gate of transistor 340, whereas control switch 342 is coupled to control switch 341, the gate of transistor 340, and ground. Similarly, control switch 381 is coupled to the bias voltage (bias 301) and the gate of transistor 380, whereas control switch 382 is coupled to control switch 381, the gate of transistor 380, and ground. In one embodiment, the bias voltage (bias 301) is the gate control signal used in a current mirror transistor (not shown) of non-programmable current source 215 (shown in FIG. 2).

In one embodiment, the control signals for transistors 311 and 312 are complimentary. In other words, when the control signal for transistor 311 is a binary high voltage signal, the control signal for transistor 312 is a binary low voltage signal, and vice versa. In one embodiment, transistors 310-312 are n-channel metal oxide semiconductor (NMOS) transistors. As a result, in one embodiment, when transistor 311 is on, transistor 312 is off, and transistor 310 is on, and vice versa.

Similarly, in one embodiment, the control signals for transistors 321 and 322 are complimentary. In one embodiment, transistors 320-322 are NMOS transistors. As a result, in one embodiment, when transistor 321 is on, transistor 322 is off, and transistor 320 is on, and vice versa. Similarly, in one embodiment, the control signals for transistors 341 and 342 are complimentary. In one embodiment, transistors 340-342 are NMOS transistors. As a result, in one embodiment, when transistor 341 is on, transistor 342 is off, and transistor 340 is on, and vice versa. Similarly, in one embodiment, the control signals for transistors 381 and 382 are complimentary. In one embodiment, transistors 380-382 are NMOS transistors. As a result, in one embodiment, when transistor 381 is on, transistor 382 is off, and transistor 380 is on, and vice versa.

Variable current source 217 provides a variable current to cancel DC voltage offsets. In one embodiment, the controls of the current sources are set after calibration to determine the amount of variable current needed to overcome the voltage offset.

Figure 4:
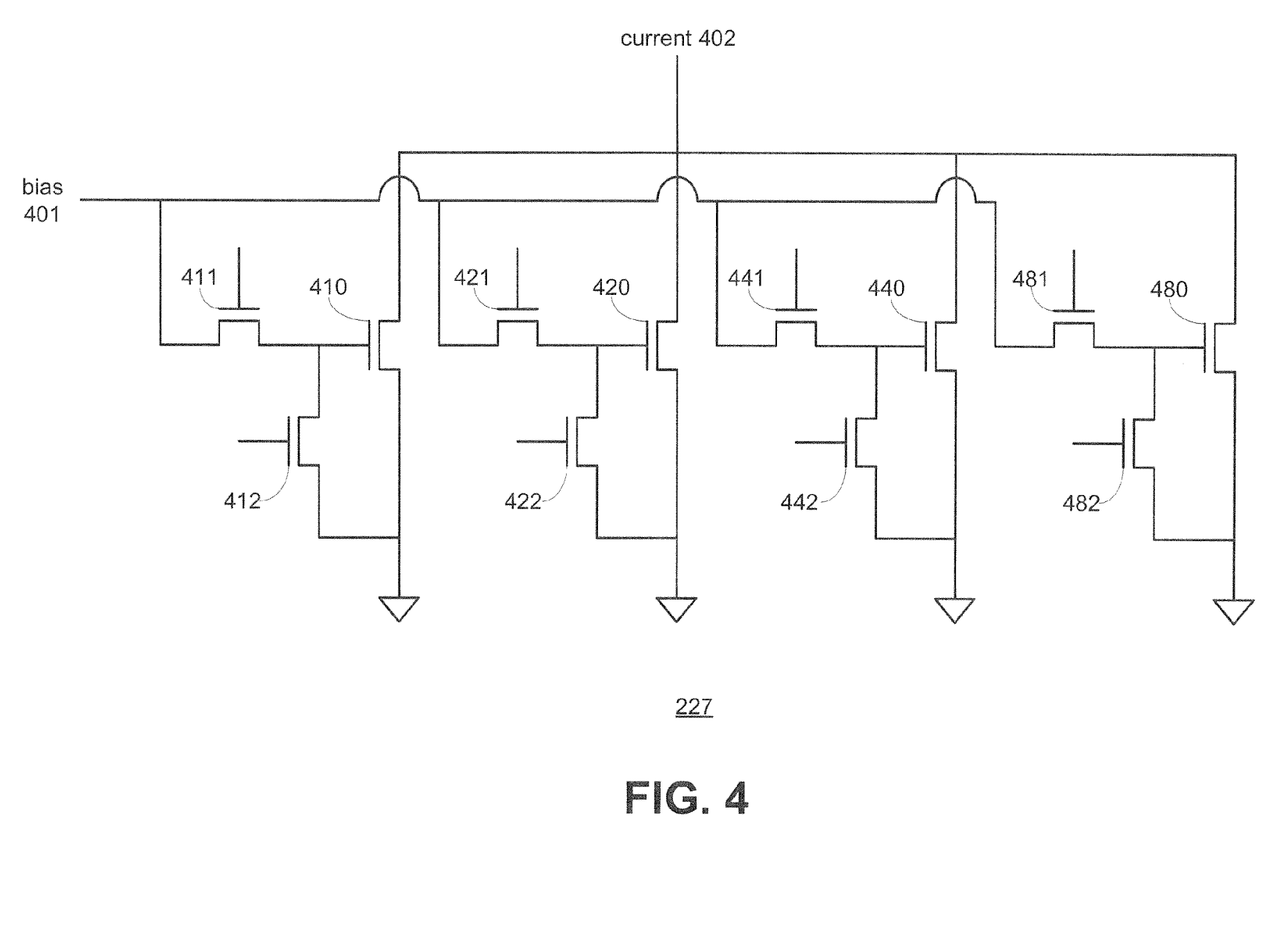
FIG. 4 is a detailed diagram of an embodiment of another variable current source of FIG. 2.

FIG. 4 is a detailed diagram of an embodiment of another variable current source of FIG. 2. In FIG. 4, programmable current source 227 includes current sources 410, 420, 440, and 480, and control switches 411, 412, 421, 422, 441, 442, 481, and 482, which are coupled as shown. Current sources 410, 420, 440, and 480 may also herein be referred to as transistors 410, 420, 440, and 480. Similarly, control switches 411, 412, 421, 422, 441, 442, 481, and 482 may also herein be referred to as transistors or control transistors 411, 412, 421, 422, 441, 442, 481, and 482. In programmable current source 227, the bias voltage (bias 401) is coupled to transistors 311, 321, 341, and 381. In one embodiment, the bias voltage (bias 401) is the gate control signal used in the current mirror transistor (not shown) of non-programmable current source 225 (shown in FIG. 2). In one embodiment, bias voltages 301 and 401 represent the same gate control signal. Current 402 represents the total current produced by programmable current source 227 and is the sum of the currents produced by transistors 410, 420, 440, and 480.

With possible exceptions noted above, programmable current source 227 is similar to programmable current source 217 and operates in a similar manner. Components and signals in programmable current source 227 have reference numbers that differ by 100 from the reference numbers used for the corresponding components and signals in programmable current source 217. As programmable current source 217 has been described in detail above, programmable current source 227 will not be described in further detail herein.

In one embodiment, the equalizer circuitry of the present invention operates at a higher data rate and has a lower input data voltage swing. More specifically, in one embodiment, the equalizer circuitry operates at dates rates in compliance with high speed serial interface protocols and has a voltage swing of approximately 100 mV. Also, in one embodiment, a device including the equalizer circuitry is fabricated using deep submicron semiconductor processing technology.

An equalizer circuitry according to an embodiment of the present invention might be included in a variety of integrated circuits (ICs), including ICs that are programmable logic devices (PLDs). PLDs (also sometimes referred to as complex PLDs (CPLDs), programmable array logic (PALs), programmable logic arrays (PLAs), field PLAs (FPLAs), erasable PLDs (EPLDs), electrically erasable PLDs (EEPLDs), logic cell arrays (LCAs), field programmable gate arrays (FPGAs), or by other names) provide the advantages of fixed ICs with the flexibility of custom ICs. Such devices typically provide an "off the shelf" device having at least a portion that can be programmed to meet a user's specific needs. Application specific integrated circuits (ASICs) have traditionally been fixed ICs. However, it is possible to provide an ASIC that has a portion or portions that are programmable. Thus, it is possible for an IC device to have qualities of both an ASIC and a PLD. The term PLD as used herein will be considered broad enough to include such devices.

PLDs have configuration elements that may be programmed or reprogrammed. Configuration elements may be realized as random access memory (RAM) bits, flip-flops, electronically erasable programmable read-only memory (EEPROM) cells, or other memory elements. Placing new data into the configuration elements programs or reprograms the PLD's logic functions and associated routing pathways. Configuration elements that are field programmable are often implemented as RAM cells (sometimes referred to a "configuration RAM" (CRAM)). However, many types of configurable elements may be used including static or dynamic RAM (SRAM or DRAM), electrically erasable read-only memory (EEROM), flash, fuse, and anti-fuse programmable connections. The programming of configuration elements can also be implemented through mask programming during fabrication of the device. While mask programming may have disadvantages relative to some of the field programmable options already listed, it may be useful in certain high volume applications. For purposes herein, the generic term "configuration element" will be used to refer to any programmable element that may be configured to determine functions implemented by other PLD elements.

Figure 5:
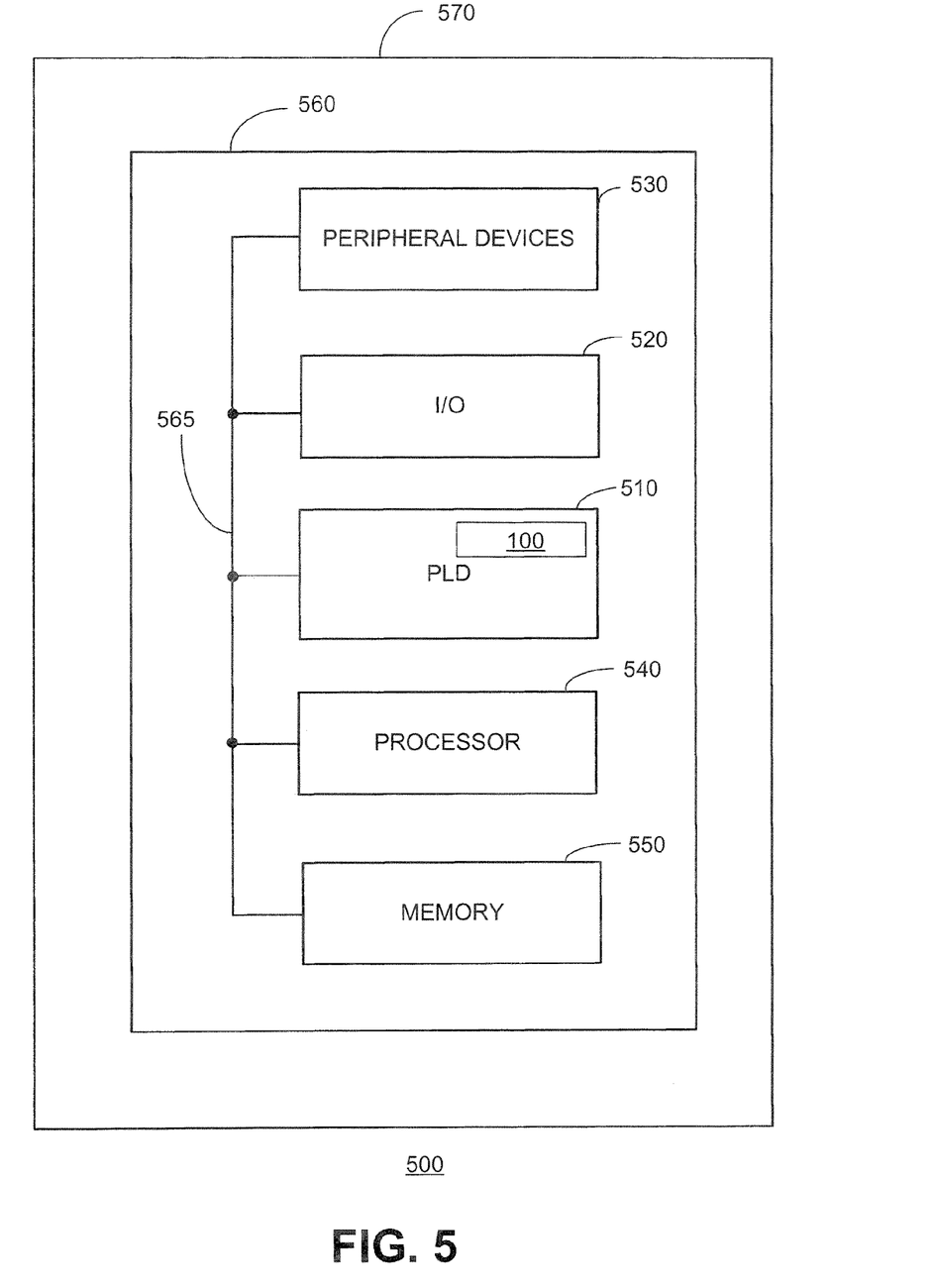
FIG. 5 illustrates an exemplary data processing system including an exemplary programmable logic device in which embodiments of the equalizer circuitry in accordance with the present invention might be implemented.

FIG. 5 illustrates an exemplary data processing system including an exemplary PLD in which embodiments of the equalizer circuitry in accordance with the present invention might be implemented. In FIG. 5, data processing system 500, among other things, includes PLD 510. PLD 510, in turn, includes equalizer circuitry 100. In one embodiment, equalizer circuitry 100 is on the same die/chip as PLD 510. In one embodiment, the logic for equalizer circuitry 100 is supported by the programmable PLD core of PLD 510. Data processing system 500 may include one or more of the following components: processor 540, memory 550, input/output (I/O) circuitry 520, and peripheral devices 530. These components are coupled together by system bus 565 and are populated on circuit board 560 which is contained in end-user system 570. A data processing system such as system 500 may include a single end-user system such as end-user system 570 or may include a plurality of systems working together as a data processing system.

System 500 can be used in a wide variety of applications, such as computer networking, data networking, instrumentation, video processing, digital signal processing (DSP), or any other application where the advantage of using programmable or reprogrammable logic is desirable. PLD 510 can be used to perform a variety of different logic functions. For example, PLD 510 can be configured as a processor or controller that works in cooperation with processor 540 (or, in alternative embodiments, a PLD might itself act as the sole system processor). PLD 510 may also be used as an arbiter for arbitrating access to a shared resource in system 500. In yet another example, PLD 510 can be configured as an interface between processor 540 and one of the other components in system 500. It should be noted that system 500 is only exemplary.

In one embodiment, system 500 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. An equalizer circuitry comprising:
   an equalizer stage including:
      a programmable current source, wherein current from the programmable current source cancels direct current (DC) voltage offset of the equalizer circuitry.

2. The equalizer circuitry of claim 1, wherein the programmable current source is programmable in user mode.

3. The equalizer circuitry of claim 1 comprising:
   a plurality of equalizer stages including the equalizer stage, wherein the equalizer stage is a second equalizer stage in the plurality of equalizer stages.

4. The equalizer circuitry of claim 1, wherein the programmable current source includes a plurality of current sources coupled in parallel and a plurality of sets of control switches for controlling the plurality of current sources.

5. The equalizer circuitry of claim 4, wherein each current source of the plurality of current sources includes a transistor and each set of control switches of the plurality of sets of control switches is for controlling a respective current source and includes a pair of transistors for controlling the respective current source.

6. The equalizer circuitry of claim 1, wherein the equalizer stage further comprises:
   load resistors;
   a differential pair coupled to the load resistors;
   a pair of non-programmable current sources coupled to the differential pair, wherein the programmable current source is coupled in parallel to one non-programmable current source of the pair of non-programmable current sources;
   a degenerating resistor coupled to the differential pair;
   a degenerating capacitor coupled to the differential pair; and
   a second programmable current source coupled in parallel to another non-programmable current source of the pair of non-programmable current sources.

7. A programmable logic device including the equalizer circuitry of claim 1.

8. A digital system comprising a programmable logic device including the equalizer circuitry of claim 1.

9. A method of equalization, the method comprising:
applying current from a programmable current source in an equalizer stage, wherein the applying cancels direct current (DC) voltage offset in an equalizer circuitry including the equalizer stage.

10. The method of claim 9, wherein the equalizer stage is a second equalizer stage in the equalizer circuitry.

11. The method of claim 9, the applying includes applying a plurality of control signals for controlling a plurality of current sources, wherein each current source includes a respective transistor.

12. The method of claim 11 further comprising:
determining the plurality of control signals required for cancelling the DC voltage offset.

13. An equalizer circuitry comprising:
a plurality of equalizer stages, wherein a second equalizer stage of the plurality of equalizer stages includes:
load resistors;
a differential pair coupled to the load resistors;
a pair of non-programmable current sources coupled to the differential pair;
a first programmable current source coupled in parallel to a first non-programmable current source of the pair of non-programmable current sources; and
a second programmable current source coupled in parallel to a second non-programmable current source of the pair of non-programmable current sources, wherein current from the first and second programmable current sources cancels direct current (DC) voltage offset in the equalizer circuitry.

14. The equalizer circuitry of claim 13, wherein the first and second programmable current sources are programmable in user mode.

15. The equalizer circuitry of claim 13, wherein the first programmable current source includes a first plurality of current sources coupled in parallel and a first plurality of sets of control switches for controlling the first plurality of current sources, and wherein the second programmable current source includes a second plurality of current sources coupled in parallel and a second plurality of sets of control switches for controlling the second plurality of current sources.

16. The equalizer circuitry of claim 15, wherein each current source of the first plurality of current sources includes a first transistor and each set of control switches of the first plurality of sets of control switches is for controlling a first respective current source of the first plurality of current sources and includes a first pair of transistors for controlling the first respective current source, and wherein each current source of the second plurality of current sources includes a second transistor and each set of control switches of the second plurality of sets of control switches is for controlling a second respective current source of the second plurality of current sources and includes a second pair of transistors for controlling the second respective current source.

17. A programmable logic device including the equalizer circuitry of claim 13.

18. A digital system comprising a programmable logic device including the equalizer circuitry of claim 13.

* * * * *